May 16, 1961   R. C. TYTLER ET AL   2,983,937
MOTOR-VEHICLE WASHING APPARATUS
Filed March 6, 1959   6 Sheets-Sheet 1

INVENTORS.
Reinold C. Tytler,
BY Loddy J. Dombek,

May 16, 1961

R. C. TYTLER ET AL 2,983,937

MOTOR-VEHICLE WASHING APPARATUS

Filed March 6, 1959

INVENTORS.
Reinold C. Tytler,
BY Loddy J. Dombek,

May 16, 1961  R. C. TYTLER ET AL  2,983,937
MOTOR-VEHICLE WASHING APPARATUS
Filed March 6, 1959  6 Sheets-Sheet 5

INVENTORS.
Reinold C. Tytler,
BY Loddy J. Dombek,

United States Patent Office 2,983,937
Patented May 16, 1961

2,983,937
MOTOR-VEHICLE WASHING APPARATUS
Reinold C. Tytler, Syracuse, and Loddy J. Dombek, Warsaw, Ind., assignors to Ross and White Company, Chicago, Ill., a corporation of Illinois
Filed Mar. 6, 1959, Ser. No. 797,739
16 Claims. (Cl. 15—21)

This invention relates to apparatus for washing motor vehicles, especially of the massive van and trailer type.

Modern motor transport vehicles, especially of the larger sizes such as the van and trailer type, traveling over long distances, through various sections of country, and in all kinds of weather, become surfaced with dirt and grime and present a washing problem of considerable magnitude. Of recent years various forms of vehicle-washing equipment have been devised and subject to use with the many types of motor vehicles. However, most, if not all, such equipment has not been capable of an economical and expeditious operation suitable for present-day demands, especially with vehicles of the aforesaid massive van and trailer type. Certain of these massive van and trailer vehicles present a special problem in the use of washing equipment for the reason that the vehicles mount an outwardly-protruding refrigerator unit on the upper front end of the vehicle.

The main objects of this invetnion are to provide an improved form of motor-vehicle washing apparatus especially adapted for use with the large size motor vehicles of the van and trailer type; to provide an improved motor-vehicle washing apparatus of this kind in which a pair of brushes are automatically operated to successively wash the front, the sides and the rear of a motor-vehicle as it moves through a predetermined path of extremely limited dimensions under control of the vehicle operator; to provide in a motor-vehicle washing apparatus of this kind an improved mounting of the pair of vertically-rotating brushes so as to be oppositely reciprocable in a common plane transverse of the vehicle and oppositely swingable relative to the common plane for positioned and pressured contact against the motor vehicle to effect the washing operation; to provide an improved series of auxiliary motor means for reciprocating and swinging the brushes in and relative to their functioning; to provide an improved system of electrically-actuated mechanisms for effecting the predetermined sequential operation of the series of auxiliary motor means; to provide an improved arrangement of switches activated by the movement of the motor vehicle through the predetermined path for timing the functioning of the electrically-actuated mechanisms; to provide improved means for directing wetting and rinsing sprays against the vehicle synchronized with the brush operation to facilitate a thorough cleansing of the vehicle; and to provide an improved vehicle-controlled washing apparatus of this kind which, considering its efficient and expeditious functioning, is comparatively economical to construct, install and operate.

In the adaptation shown in the accompanying drawings.

The essential concept of this invention involves a pair of motor-driven rotary brushes journaled on yokes, supported on horizontally-spaced standards for opposite reciprocation in a common vertical plane and opposite horizontal swinging out of and into that plane through the coordinated sequential action of a series of auxiliary motors controlled by electrically-actuated mechanisms regulated by switches activated by the driver-operated movement of a vehicle along a predetermined path, the cleansing action of the brushes being facilitated by an advance and subsequent directing of wetting and rinsing sprays against the vehicle in its travel through the predetermined path.

A vehicle washing-apparatus embodying the foregoing concept comprises a pair of standards 21 from each of which a yoke 22, journaling a brush 23, is supported on a cross-arm mounting 24 for the horizontal reciprocation and swinging of the brushes 23, by the action of hydraulic motors 25 and 26, for pressured rotative contact with a motor vehicle V respectively subsequent to and in advance of the application of wetting and rinsing sprays from pipes 27 and 28, respectively, all under the control of a system of electrically-actuated mechanisms M the timed operation of which is regulated by dangle switches 29, 30, 31 and 32, positioned for contact by the vehicle V as it moves into and along a predetermined path P.

Figure 6:
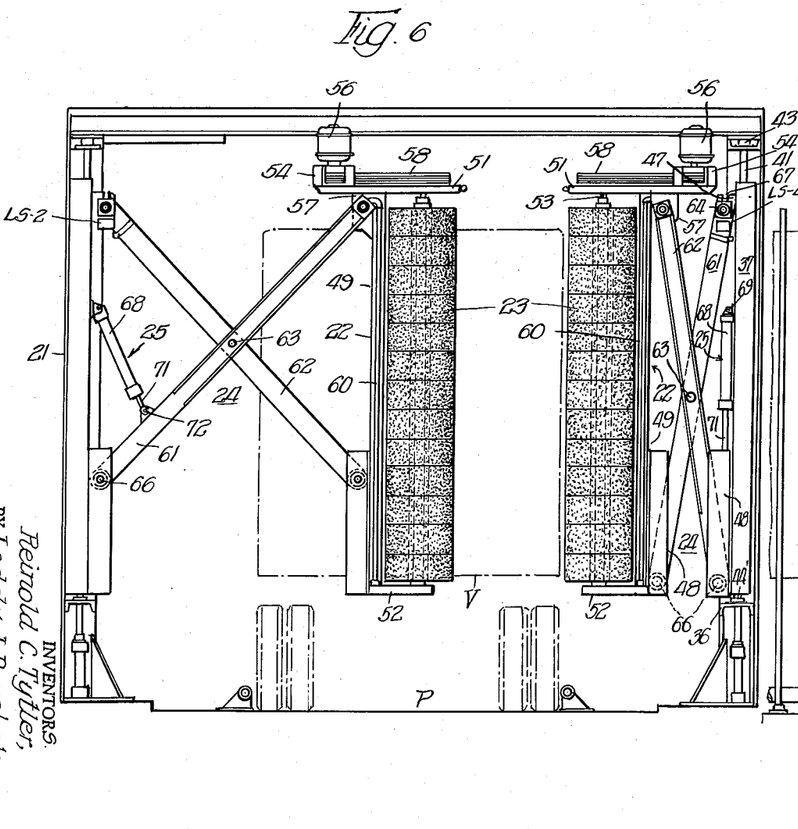
Fig. 6 is an end elevation of the view shown in Fig. 4.
Figure 7:
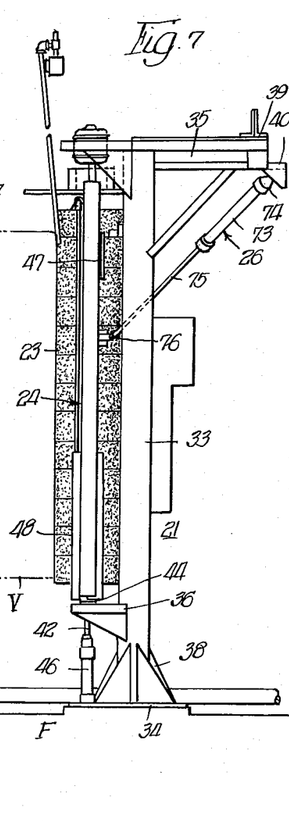
Fig. 7 is a side view of what is shown in Fig. 6.

The standards 21 each comprise a column 33 (Figs. 6, 7 and 8) mounted on a base 34 and supporting brackets 35 and 36 on each pair of which is journaled a rotative member 37, for support of the brush-yoke 22 through the medium of the cross-arm mounting 24, as hereinafter will be explained more fully.

The column 33 and base 34 are suitably bonded together and strengthened by a series of triangular gussets 38. The bases 34 are bolted to a concrete foundation F to locate the standards 21 in horizontally-spaced relationship at the sides of the path P for the travel of the vehicle V during the washing process.

The bracket 35, as here shown, is made up of a pair of parallel channel plates 39 and 40. The plate 39 caps the column 33, extending out from opposite sides, and with the bracket 36 forms a support for the rotative member 37, as presently will be explained. The plate 40 extends outwardly from one side of the column 33, just below the plate 39 to which it is braced, and forms a support for one end of a hydraulic motor 26.

The bracket 36 is secured to the column 33 near its lower end in vertically-opposed relationship to the overhanging end of the bracket plate 39 with which the bracket 35 coacts to journal the rotative member 37.

The rotative member 37 here is supported on short sections of shaft 41 and 42 slidably and rotatively mounted in bearings 43 and 44 respectively on the brackets 35 and 36. The lower shaft section 41 is connected to a hydraulic motor 46 for adjusting the elevation of the respective brush 23, as presently will be explained more fully. Each such rotative member 37, adjacent its upper end, mounts spaced flanges 47 and, adjacent its lower end, mounts a trolley-wheel track 48 to which are respectively hinged and slidably connected the brush-yoke mounting 24, as will be explained presently.

Figure 1:
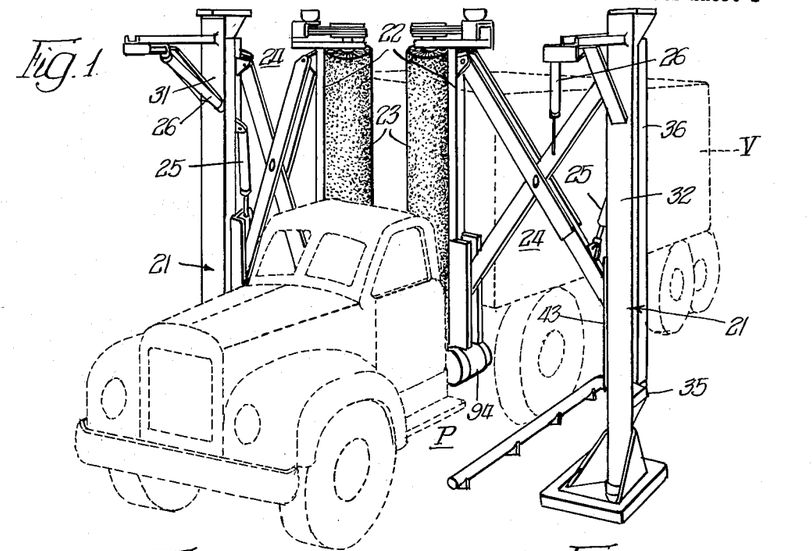
Figure 1 is a front perspective view of an apparatus constructed in accordance with this invention in the process of washing the front end of a vehicle.
Figure 2:
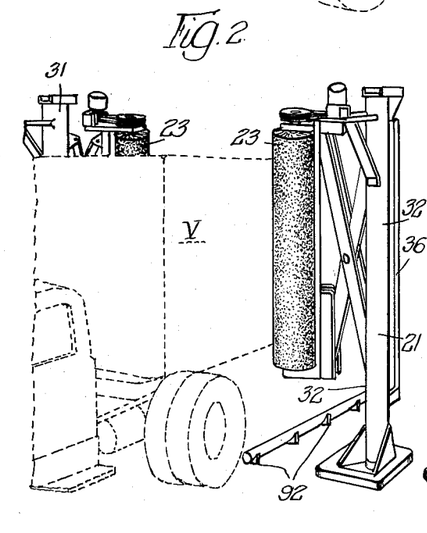
Fig. 2 is a similar view of the apparatus in the process of washing the sides of the vehicle.
Figure 3:
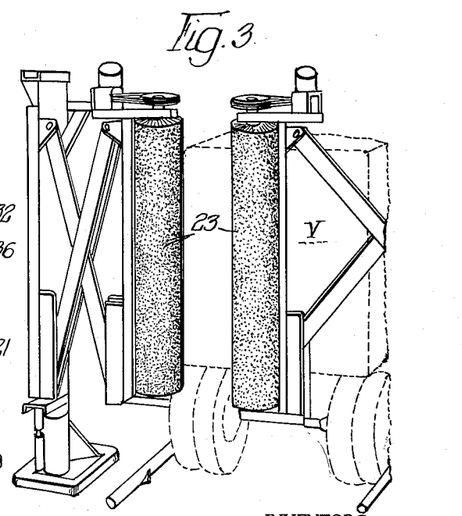
Fig. 3 is a rear perspective of the apparatus in the process of washing the rear end of the vehicle.

Each brush yoke 22 comprises a bar 49, a top plate 51, and a base plate 52. As Figs. 1, 2 and 3 show, the bar 49 is of a length greater than the height of the largest vehicle body which is likely to be washed by this apparatus. The top plate 51 extends across the upper end of the bar 49 and one end has fixed thereon a mounting 54 for a brush-driving motor 56. The mounting 54 is braced by a pair of spaced flanges 57 which coact with the trolley-wheel track 48 to afford support for the yoke-mounting 24, as presently will be described. The opposite end of the top plate 51 is opposed to and coacts with the base plate 52 to journal a brush shaft 53 driven by the motor 56 through the medium of a conventional belt 58.

The brushes 23 are more or less conventional structures, comprising a predetermined number of segments with bristles circumferentially arranged on sections of tubing adapted for support on the shaft 53. Longitudinally arranged adjacent each of the brushes is one or more spray pipes 60 (Fig. 6) which supplies water to the brush 23 during its rotating contact with the vehicle V being washed. The cleansing action of the brushes 23 is facilitated by an advance and subsequent directing of wetting and rinsing sprays against the vehicle in its travel through the predetermined path, as will be explained presently.

The yoke mountings 24 each comprise a pair of channel-shaped arms 61 and 62, medially pivoted together at 63 and each, at one end, mounting oppositely-extending trunnions 64 and at the other end mounting trolley wheels 66.

Figure 14:
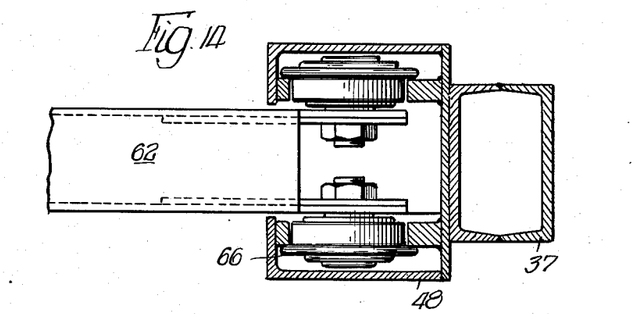
Fig. 14 is an enlarged, fragmentary, sectional detail showing the trolley-wheel mounting for the lower ends of the X-arm mountings that support the brush yokes.
Figure 15:
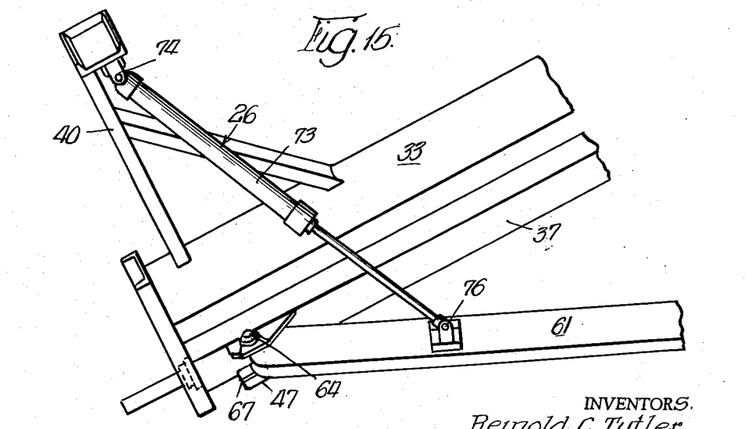
Fig. 15 is a fragmentary, top plan view of a part of the brush swinging mechanism at the left end of Fig. 4.

The trunnions 64, on the arm 61, seat in upwardly-open slots 67 in the flanges 47 on one of the rotative members 37 whereas the trunnions 64 on the arm 62 seat on the flanges 57 on the respective yoke bars 49. The trolley wheels 66 at the lower end of the arm 62 (Fig. 14) travel in the tracks 48 on the rotative member 37, and the trolley wheels 66 at the lower end of the arm 61 travel in the trolley tracks 48 at the lower end of the yoke bar 49.

The arms 61 and 62 thus being hinged to each other at 63 and slidably supported on the rotative member 37 and the brush-yoke 22, the respective brushes 23 are oppositely reciprocable, by action of the hydraulic motor 25, in a common plane transverse to the travel of the motor vehicle V to be washed, as later will be explained more fully.

The rotative member 37, whereon the brushes 23 are supported as hereinbefore explained, being journaled on the standard columns 33, as also previously explained, by action of the hydraulic motors 26 will swing the brushes 23 horizontally in opposite directions out of and into the plane of reciprocation of the brushes, in a manner and for a purpose later to be explained fully.

The hydraulic motors 25 and 26, for respectively reciprocating and swing the brushes 23, as here shown, are conventional units. Obviously, they could be pneumatic motors for effecting the same movements of the brushes 23.

The cylinder 68 of each motor 25 is hinged at 69 (Fig. 6) to the respective rotative member 37 and the piston rod 71 is hinged at 72 to the arm 62 of the respective mounting arm 61, above the trolley wheels 66. The cylinder 73 of each hydraulic motor 26 is hinged by a universal joint 74 (Figs. 7, 8, 13 and 15) to the outer end of the column plate 40 and the end of the piston rod 75 is hinged by a universal joint 76 to the mounting arm 61 of brush-yoke mounting 24.

The hydraulic motors 46, for raising and lowering the brushes 23, have their cylinders 80 (Fig. 8) secured to the foundation F and have their piston rods 80' alined with and seating the respective shaft sections 42 of the rotative members 37.

These hydraulic motors 25, 26, and 46 are double-acting units and through a system of flexible hose 77 and piping 78 (Fig. 8) are connected to a conventional power unit 79 to effect the reciprocation, swinging, and raising and lowering of the brushes 23, as presently will be set forth fully.

Figures 8, 9, 11:
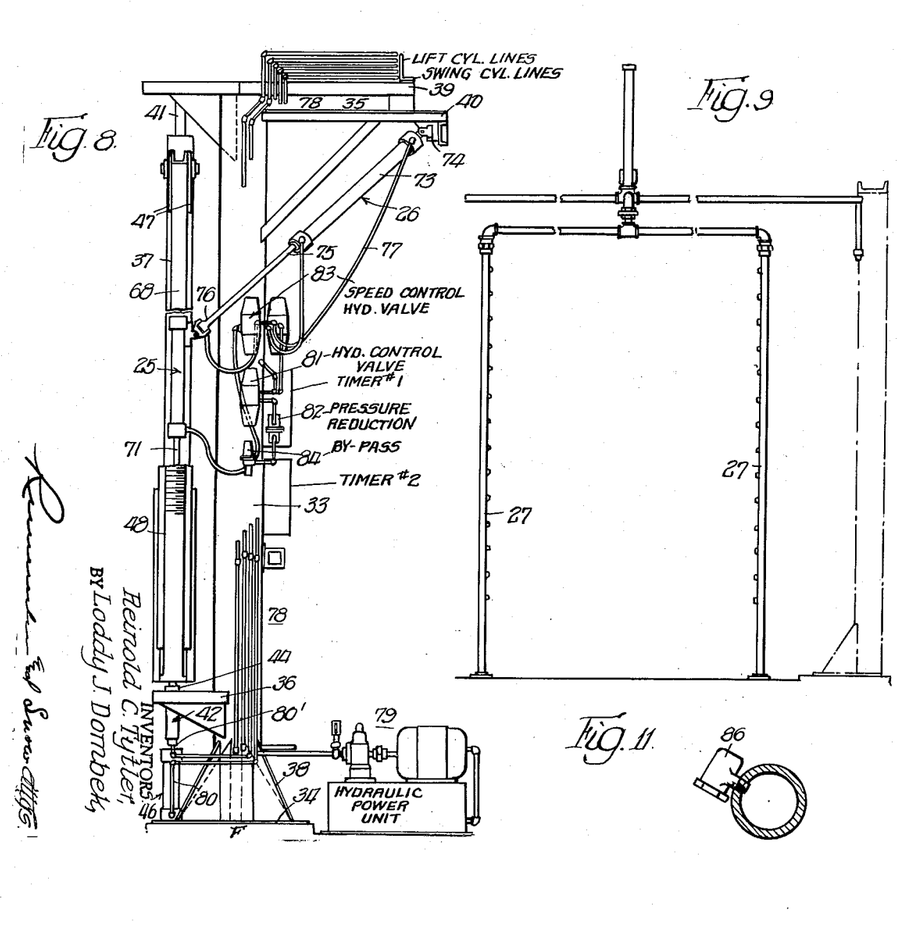
Fig. 8 is a side view similar to Fig. 7, showing the hydraulic mechanisms whereby the brushes are reciprocated and swung during the washing operation.
Fig. 9 is a reduced end view of the wetting spray pipe arch through which the vehicle enters in the washing process.
Fig. 11 is an enlarged detail view of a preferred form of wetting spray nozzle.
Figure 10:
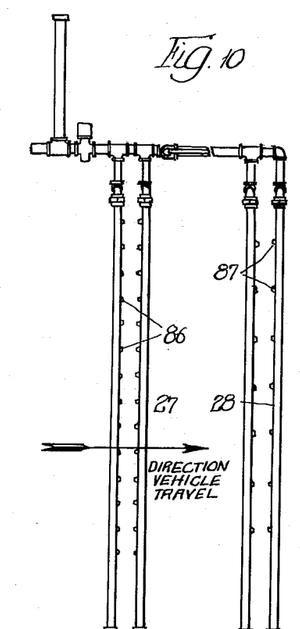
Fig. 10 is a side view of the same.

Interposed in the aforesaid the connections between the pump 79 and the motors 25, 26 and 27 is an appropriate arrangement of conventional hydraulic control valves 81, pressure-reducing valves 82, speed control valves 83 and by-pass valves 84 (Fig. 8). These several valves 81–84 are variously operated in the well-known manner by solenoids forming a part of the system of electrically-actuated mechanisms M (Fig. 16), subsequently to be described.

Figure 4:
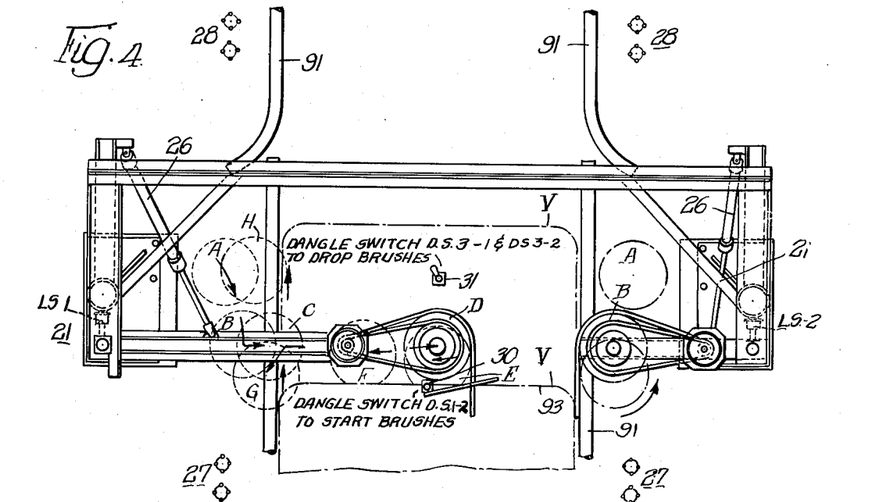
Fig. 4 is a partial plan view of a vehicle-washing apparatus, constructed in accordance with this invention, indicating various positions of the advancing truck and the movements of one of the pair of brushes for washing the front and sides of the vehicle.
Figure 5:
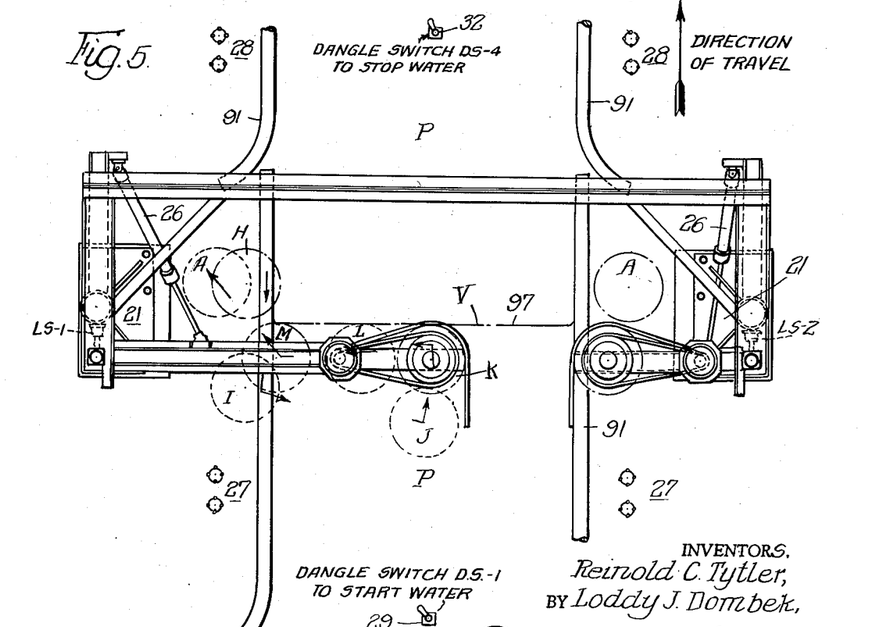
Fig. 5 is a similar view indicating various positions of one of the pair of brushes for washing the rear end of the vehicle.
Figure 12:
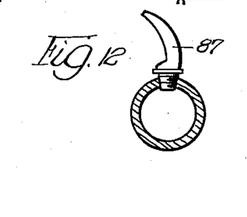
Fig. 12 is a similar view of a rinsing spray nozzle.
Figure 13:
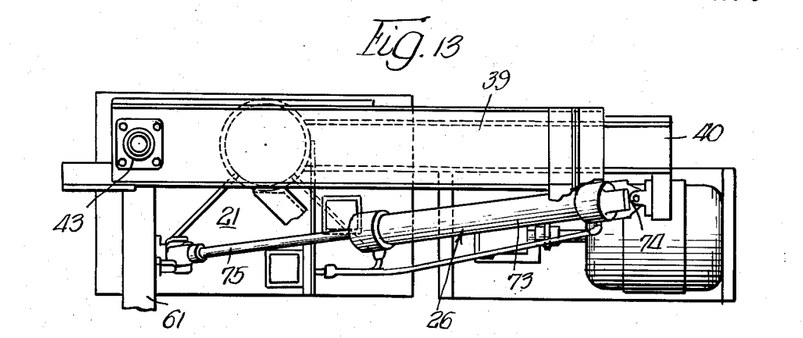
Fig. 13 is an enlarged, top plan view of the mechanism shown in Figs. 7 and 8.

The spray pipes 27 and 28 (Figs. 4, 5 and 9) here are shown set up in pairs at opposite sides of the vehicle path P and respectively fore and aft of the standards 21. The pipes 27 mount a series of oppositely-directed nozzles 86 (Fig. 11) whereas the pipes 28 mount a series of oppositely-directed nozzles 87 (Fig. 12). The nozzles 86 direct wetting jets respectively against the advancing and trailing ends of the vehicle V before the brushes 23 are put into action against the vehicle. The nozzles 87 direct rinsing sprays respectively against the advancing and trailing ends of the vehicle V following the action of the brushes on the vehicle.

In addition to the wetting and rinsing spray pipes 27 and 28, there is another spray arch (not here shown) for rinsing the sides of the vehicles. This rinsing spray arch is placed at a point in advance of the rinsing spray pipes 28 and is connected to operate simultaneously with the end rinsing spray pipes 28.

The nozzles 86 and 87 are differently formed as shown in Figs. 11 and 12. The nozzles 86, for directing the wetting jets, are formed to project the water with considerable force against the vehicle with a view to loosening up the accumulated grime and dirt. The nozzles 87, on the other hand, are designed to fan out the jets of water to project a volume of water most likely to rinse off any particles of loosened grime and dirt not removed by the action of the brushes 23.

The dangle switches 29, 30, 31 and 32, which are conventional devices, are positioned along the median of the vehicle path P and relative to the height of the average vehicle, that could be accommodated in this apparatus, so that as the vehicle moves along path P it will successively contact these dangle switches 29, 30, 31 and 32 to effect the seriatim operation requisite to starting the sprays, operating the brushes, and arresting the action of the sprays.

Figure 16:
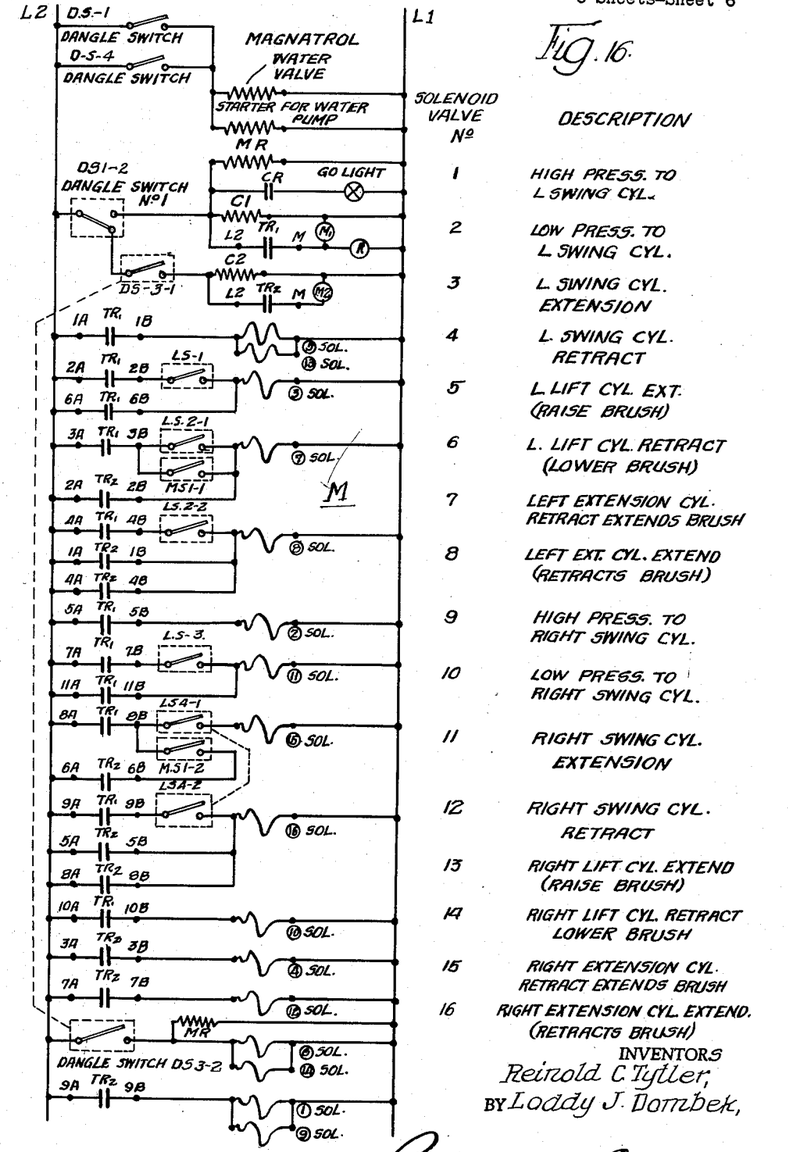
Fig. 16 is a schematic view of the electrical circuit and the various mechanisms which control and effect the operation of this apparatus to cause the washing of a vehicle.

The system of electrically-actuated mechanisms M, which effect the reciprocation, swinging, and raising and lowering of the brushes 23, and the action of the wetting and rinsing sprays 27 and 28, is diagrammed in Fig. 16. The primary mechanisms are solenoids, indicated in circled members 1 to 16 in this layout. Such solenoids operate the previously-described valves 81–84 and successively numbered 1 to 16 in Fig. 16. The respective functions of these sixteen solenoid-operated valves of Fig. 16 are indicated in the tabulation, which forms a part of this figure and will be set forth more explicitly in a subsequent explanation of the operation of this apparatus in washing a vehicle V. The functioning of these solenoids 1 to 16 is regulated by appropriately-arranged, and in this view, conventionally-identified switches, contacts, resistors, lights, and the like, bridging the power lines L1 and L2 in series with the respective solenoids.

In order to insure an accurate positioning of a vehicle V for effective washing, parallel tire guide-rails 91 are secured to the foundation F. These are sections of suitable tubing bonded to brackets 92 anchored to the foundation F. In the drawings these guide rails 91 are shown in two sections. One section extends from the outwardly-curved ends at the point of entrance of the vehicle V to a point beyond the standards 21. The other section, with outwardly curved ends, extends from the inner end of the one section to a point where a vehicle V is expected to leave the path P.

Before detailing the operation of this apparatus, it should be recalled that some of the massive type van and trailer vehicles mount refrigerating units on their front ends. For such vehicles it is not possible to allow the brushes 23 of this washing apparatus to be operated across the front end of the vehicle. Accordingly, a manual selector switch is arranged adjacent the entrance to the path P of this apparatus. This switch, indicated in the diagram of Fig. 16 as "MS1–1" and "MS1–2," has two positions, one of which is marked "With Refrig" and the other "Without Refrig." The variation in the functioning of this apparatus, resulting from the setting of this switch, will be recited in the following explanation of the operation of the apparatus.

The driver of the vehicle V which is to be washed stops at the approach to the path P to permit setting the selector switch just described. Assume the vehicle is without a refrigerating unit. The driver sets the switch at "Without Refrig" position, which is the "closed" position of "MS1" in the diagram, and moves his vehicle on into the position indicated in the first dotted outline 93 of the front end of the vehicle shown in Fig. 4.

As the vehicle V moves into contact with the dangle switch DS–1 (29 in Fig. 5) it closes a circuit to and opens a valve to the water supply for sprays 27, 28 and 60. Further advance of the vehicle contacts dangle switch DS1–2 (30 in Fig. 4) which actuates the timer #1 (Figs. 8 and 16).

Energization of the timer #1 bridges the contact 1A—1B and energizes the solenoids to valves 5 and 13 to activate the motor 46 (Fig. 7) to lift the brushes 23 above the saddle tanks 94 on the front of the vehicle V (Fig. 1). The sequential bridging of the contacts 2A—2B energizes the solenoids to the valve No. 3 to activate the motor 26 to swing the left-hand brush 23 from "home" position A (Fig. 4) to starting position B before motor 25 is activated to extend the brush to position C.

A subsequent bridging of the contacts 3A—3B energizes the solenoid to valve No. 7 which activates the motor 25 for the left-hand brush 23 to extend it through position C to position D which is approximately 3″ over the center line of the vehicle V. The subsequent successive bridging of the contacts 4A—4B, 5A—5B, and 6A—6B, under the control of timer #1, closes the respective solenoids to the valves 8, 2 and 3 (diagram Fig. 16) to successively activate the hydraulic motor 25 for this left-hand brush 23 to move it into position E in pressured contact with the front of the vehicle V. Hydraulic motor 26 then returns the brush along the vehicle front to position G at which position the hydraulic pressure is reduced to 50 p.s.i. At the position G the limit switch LS2 (Figs. 6 and 16) is contacted to effect the deenergization of the solenoid to valve No. 8 to cause the motor 25 to restore the brush to position C.

As the left-hand brush 23 reaches position E, the subsequent successive bridging of the contacts 7A—7B, 8A—8B, 9A—9B, 10A—10B, and 11A—11B so control the activation of the motors 25 and 26 as to cause the same series of movements for right-hand brush 23 as just delineated for the left-hand brush.

As soon as the right-hand brush 23 has been returned to its position C, timer #1 is deenergized and the "Go" light is energized to signal to the driver to advance the vehicle V. When this advance of the vehicle V is sufficient for the brushes 23 to clear the saddle tanks 94, the vehicle contacts dangle switch DS3–2, 31 (Fig. 4) which energizes the solenoids for valves No. 6 and 14 resulting in the activation of the motor 46 to lower the brushes 23 and effect the washing of the sides of the vehicle V as it continues its advance to position 97 shown in dotted outline in Fig. 5.

As the rear end of the vehicle releases the dangle switch 30 (Fig. 4) the "Go" light is deenergized and the timer #2 is energized to effect the seriatim activation of the above-described mechanisms to cause the successive movement of the brushes 23 across the rear of the vehicle V from the position H (Fig. 5) through the positions I, J, K, L, M, and back to A.

As soon as the right-hand brush 23 has been returned to its "home" position A timer #2 (Figs. 8 and 16) stops and the circuit of Fig. 16 is opened and all the mechanisms are inactivated.

The driver then proceeds on his way out of the washing path P. As the vehicle frees the dangle switch DS–4 (32 in Fig. 5) the water supply is cut off to the sprays 27, 28 and 60 and the apparatus is ready to effect the washing of another vehicle.

When the vehicle V with a refrigerating unit approaches the washing path P, the driver turns the selector switch "MS1" to the position "With Refrig" and proceeds as above explained. However, such positioning of the selector switch so effects the circuits to the mechanisms M above described, as to arrest the operation of the motors 25 and 26 and cause the brushes 23 to become locked in positions C, and a consequent energization of the "Go" light. The driver, thereupon advances the vehicle to the position 97 during which the brushes 23 wash the sides of the vehicle V. When position 97 is reached the above-explained sequence of the brush movements occur for washing the rear of the vehicle.

Although but one specific embodiment of this invention is herein shown and described it will be understood that details of the construction shown may be altered or omitted without departing from the spirit of the invention as defined by the following claims.

We claim:

1. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane, between their respective fully-retracted positions and a position beyond the median between their retracted positions auxiliary motor-means for actuating the yoke-supporting means to effect the successive reciprocation of the respective yoke-mounted brushes, and a series of electrically-actuated mechanisms connected to effect a predetermined seriatim operation of the auxiliary motor-means to cause a sequential contactive movement of the brushes across one end, along the sides, and across the other end of a vehicle movable along the path between the standards.

2. A vehicle-washing apparatus comprising a pair of horizontally-spaced standards, a pair of brush-mounting yokes, a motor-driven brush journaled on each yoke, means supporting the yokes on the respective standards for horizontal reciprocation of the brushes in a common vertical plane between their respective retracted positions and a position beyond the vertical median between their retracted positions and for subsequent opposite swinging out of the common vertical plane into spaced substantially parallel transverse vertical planes and return therefrom into the common vertical plane, auxiliary motor means connected to actuate each yoke-supporting-means to effect the successive reciprocation and the opposite swinging of the yoke-mounted brushes, and a series of electrically-actuated mechanisms connected to effect a predetermined seriatim operation of the auxiliary motor-means to cause a sequential contactive movement of the brushes across one end, along the sides, and across the other end of a vehicle movable along the path between the standards.

3. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane between their respective retracted positions and a position beyond the median between their retracted positions and for subsequent opposite swinging out of the common vertical plane into spaced substantially parallel transverse vertical planes and return therefrom into the common vertical plane, auxiliary motor-means connected to actuate each yoke-supporting-means to effect the successive reciprocation and the opposite swinging of the yoke-mounted brushes, and a series of electrically-actuated mechanisms connected to effect first a pressured reciprocation of the brushes across one end of the vehicle, a subsequent pressured holding of the brushes against the respective sides, and finally a pressured reciprocation of the brushes across the other end of a vehicle movable along the path between the standards.

4. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane between their retracted positions and a position beyond the median between their retracted positions and for subsequent opposite swinging out of the common vertical plane into spaced substantially parallel transverse vertical planes and return therefrom into the common vertical plane, a series of nozzles positioned adjacent the standards and connected to a pressured-fluid supply for respectively directing wetting and rinsing sprays against the vehicle, auxiliary motor-means connected to activate the pressured-fluid supply to actuate each yoke-supporting-means to effect the successive reciprocation and opposite swinging of the yoke-mounted brushes, and a series of electrically-actuated mechanisms connected to effect a predetermined seriatim operation of the auxiliary motor-means to cause a sequential contactive movement of the brushes across one end, along the sides, and across the other end of a vehicle movable along the path between the standards after the activation of the wetting and rinsing sprays.

5. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane between their retracted positions and a position beyond the vertical median between their retracted positions and for subsequent opposite swinging out of the common vertical plane into spaced substantially parallel transverse vertical planes and return therefrom into the common vertical plane, auxiliary motor-means connected to actuate each yoke-supporting-means to effect the successive reciprocation and the opposite swinging of the yoke-mounted brushes, a series of electrically-actuated mechanisms connected to effect a predetermined seriatim operation of the auxiliary motor-means to cause a sequential contactive movement of the brushes across one end, along the sides, and across the other end of a vehicle movable along the path between the standards, and switch means activated by the movement of the vehicle along the path for successively initiating and arresting the functioning of the electrically-actuated mechanisms.

6. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane between their retracted positions and a position beyond the vertical median between their retracted positions and for subsequent opposite swinging out of the common vertical plane into spaced substantially parallel transverse vertical planes and return therefrom into the common vertical plane, a series of nozzles positioned adjacent the standards and connected to a pressured-fluid supply for respectively directing wetting and rinsing sprays against the vehicle, auxiliary motor-means connected to activate the pressured-fluid supply to actuate each yoke-supporting-means to effect the successive reciprocation and the opposite swinging of the yoke-mounted brushes, a series of electrically-actuated mechanisms connected to effect a predetermined seriatim operation of the auxiliary motor-means to cause a sequential contactive movement of the brushes across one end, along the sides, and across the other end of a vehicle movable along the path between the standards after the activation of the wetting and rinsing sprays, and a series of switches positioned for contact activation by the vehicle moving along the path for successively initiating and arresting the functioning of the electrically-actuated mechanisms.

7. A vehicle-washing apparatus comprising, a pair of horizontally-spaced standards, a pair of brush-mounting yokes, a motor-driven brush journaled on each yoke, means supporting the yokes on the respective standards for horizontal reciprocation of the brushes in a common vertical plane between their retracted positions and a position beyond the vertical median position between their retracted positions and the subsequent opposite swinging out of the common vertical plane into spaced substantially parallel transverse vertical planes and return therefrom into the common vertical plane, a series of nozzles positioned adjacent the standard and connected to a pressure-fluid supply for respectively directing wetting and rinsing sprays against a passing vehicle, auxiliary motor-means connected to activate the pressure-fluid supply and to actuate each yoke-supporting-means to effect the successive reciprocation and opposite swinging of the yoke-mounted brushes, a series of electrically-actuated mechanisms connected to effect a predetermined seriatim operation of the auxiliary motor-means to cause a sequential contactive movement of the brushes across one end, along the sides, and across the other end of a vehicle movable along the path between the standards after the release and before the arrest of the wetting and rinsing sprays.

8. A vehicle-washing apparatus comprising, a pair of horizontally-spaced standards defining a path for the advance of a vehicle to be washed, a pair of brush-mounting yokes, a motor-driven brush journaled on each yoke, pairs of crossed arms pivotally connected together intermediate their ends and respectively connected to the standards and the yokes to support the yokes for horizontal reciprocation of the brushes in a common vertical plane between their retracted positions and a position beyond the vertical median between their retracted positions, auxiliary motor-means connected to each pair of arms for the extension and retraction thereof, and a series of electrically-actuated mechanisms connected to effect a predetermined seriatim operation of the auxiliary motor-means to cause a sequential contactive movement of the brushes across one end, along the sides, and across the other end of a vehicle movable along the path between the standards.

9. A vehicle-washing apparatus comprising, a pair of horizontally-spaced standards defining a path for the advance of a vehicle to be washed, a pair of brush-mounting yokes, a motor-driven brush journaled on each yoke, pairs of crossed arms pivotally connected together intermediate their ends and at their opposite ends hinged and slidably connected to the standards and yokes respectively to support the yokes for horizontal reciprocation of the brushes in a common vertical plane, auxiliary motor-means connected to each pair of arms for the extension and retraction thereof, and a series of electrically-actuated mechanisms connected to effect a predetermined seriatim operation of the auxiliary motor-means to cause a sequential movement of the brushes across one end, along the sides, and across the other end of a vehicle movable along the path between the standards.

10. A vehicle-washing apparatus comprising, a pair of horizontally-spaced standards defining a path for the advance of a vehicle to be washed, a pair of brush-mounting yokes, a motor-driven brush journaled on each yoke, pairs of crossed arms pivotally connected together intermediate their ends, one arm of each pair being hinged at one end to a standard and having the other end slidably connected to a yoke, the other arm of each pair being hinged at one end to the respective yoke and having the other end slidably connected to a standard thereby supporting the yokes for horizontal reciprocation in a common vertical plane, auxiliary motor-means connected to each pair of crossed arms for oppositely reciprocating the yoke-mounted brush in the common plane transverse to the path of a vehicle to be washed, and a series of electrically-actuated mechanisms connected to the auxiliary motor-means to cause a sequential movement of the brushes across one end, along the sides, and across the other end of a vehicle movable along the path between the standards, and switches activated by the movement of the vehicle for successively initiating and arresting the functioning of the electrically-actuated mechanism.

11. A vehicle-washing apparatus comprising, a pair of fixed horizontally-spaced columns defining a path for the advance of a vehicle to be washed, a member rotatively supported on each column, a pair of brush-mounting yokes, a motor-driven brush journaled on each yoke, pairs of crossed arms pivotally connected together intermediate their ends, one arm of each pair being hinged at one end to one rotatable member and having the other arm end slidably connected to the respective yoke, the other arm of each pair being hinged at one end to the respective yoke and having the other end slidingly connected to the one rotatable member whereby the pairs of crossed arms support the respective yokes for horizontal reciprocation of the brushes in a common vertical plane and opposite swinging out of and into the common plane, hydraulic motor-means interposed between each rotatable member and the respective crossed arms and between each standard and the respective rotatable member for oppositely reciprocating and oppositely swinging the yoke-mounted brushes and a series of electrically-actuated mechanisms connected to effect the seriatim operation of the hydraulic motor-means to cause a sequential pressured movement of the brushes across one end, along the sides, and across the other end of the vehicle movable along the path between the posts.

12. A vehicle-washing apparatus comprising, a pair of fixed horizontally-spaced columns defining a path for the advance of a vehicle to be washed, a member rotatively supported on each column, a pair of brush-mounting yokes, a motor-driven brush journaled on each yoke, pairs of crossed arms pivotally connected together intermediate their ends, one arm of each pair being hinged at one end to one rotatable member and having the other arm end slidably connected to the respective yoke, the other arm of each pair being hinged at one end to the respective yoke and having the other end slidably connected to the one rotatable member whereby the pairs of crossed arms support the respective yokes for horizontal reciprocation of the brushes in a common vertical plane and opposite swinging out of and into the common plane, hydraulic motor-means interposed between each rotatable member and the respective crossed arms and between each standard and the respective rotatable member for oppositely reciprocating and oppositely swinging the yoke-mounted brushes, an apertured pipe fixed on each yoke and connected to a pressured water supply to direct a water spray to the respective brush, a series of nozzles positioned at opposite sides of the standards and on opposite sides of the intervening path and connected to the pressured water supply for respectively directing wetting and rinsing sprays against the vehicle, and a series of electrically-actuated mechanisms connected to effect the seriatim operation of the hydraulic motor-means to cause a sequential pressured movement of the brushes across one end, along the sides, and across the other end of the vehicle movable along the path between the posts and simultaneously supply water to the brush spray pipes and cause wetting and rinsing sprays directed against the vehicle respectively antecedent and subsequent to the aforesaid action of the brushes.

13. A vehicle washing apparatus comprising, a pair of fixed horizontally-spaced columns defining a path for the advance of a vehicle to be washed, a member rotatively supported on each column, a pair of brush-mounting yokes, a motor-driven brush journaled on each yoke, pairs of crossed arms pivotally connected together intermediate their ends, one arm of each pair being hinged at one end to one rotatable member and having the other arm end slidably connected to the respective yoke, the other arm of each pair being hinged at one end to the respective yoke and having the other end slidingly connected to the one rotatable member whereby the pairs of crossed arms support the respective yokes for horizontal reciprocation of the brushes in a common vertical plane and opposite swinging out of and into the common plane, hydraulic motor-means interposed between each rotatable member and the respective crossed arms and between each standard and the respective rotatable member for oppositely reciprocating and oppositely swinging the yoke-mounted brushes, an apertured pipe fixed on each yoke and connected to a pressured water supply to direct a water spray to the respective brush, a series of nozzles positioned at opposite sides of the standards and on opposite sides of the intervening path and connected to the pressured water supply for respectively directing wetting and rinsing sprays against the vehicle, a series of electrically-actuated mechanisms connected to effect the seriatim operation of the hydraulic motor-means to cause a sequential pressured movement of the brushes across one end, along the sides, and across the other end of the vehicle movable along the path between the posts and simultaneously supply water to the brush spray pipes and cause wetting and rinsing sprays directed against the vehicle respectively antecedent and subsequent to the aforesaid action of the brushes, and switch means activated by the movement of the vehicle along the path for successively initiating and arresting the functioning of the electrically-actuated mechanisms.

14. A vehicle-washing apparatus comprising, a pair of horizontally-spaced standards, a pair of brush-mounting yokes, a motor-driven brush journaled on each yoke, means supporting the yokes on the respective standards for vertical shifting and a horizontal reciprocation of the brushes in a common vertical plane between their retracted positions and a position beyond the vertical median between their retracted positions, auxiliary motor-means for actuating the yoke-supporting means to respectively adjust the vertical position and to effect the successive reciprocation of the yoke-mounted brushes, and a series of electrically-actuated mechanisms connected to effect a predetermined seriatim operation of the auxiliary motor-means to cause a sequential vertical adjustment and subsequent horizontal contactive movement of the brushes across one end, along the sides, and across the other end of a vehicle movable along the path between the standards.

15. A vehicle-washing apparatus comprising, a pair of horizontally-spaced standards, a pair of brush-mounting yokes, a motor-driven brush journaled on each yoke, means supporting the yokes on the respective standards for a vertical shifting and a horizontal reciprocation of the brushes in a common vertical plane between their retracted positions and a position beyond the vertical median between their retracted positions and for subsequent opposite swinging out of and into spaced vertical parallel planes, a series of nozzles positioned adjacent the standard and connected to a pressured-fluid supply for respectively directing wetting and rinsing sprays against a passing vehicle, auxiliary motor-means connected to activate the pressured-fluid supply and to actuate each yoke-supporting means to respectively adjust the vertical position and to effect the successive reciprocation and opposite swinging of the yoke-mounted brushes, a series of electrically-actuated mechanisms connected to effect a predetermined seriatim operation of the auxiliary motor-means to cause a sequential vertical adjustment and subsequent horizontal contactive movement of the brushes across one end, along the sides, and across the other end of a vehicle movable along the path between the standards after the release and before the arrest of the wetting and rinsing sprays.

16. A vehicle-washing apparatus comprising, a pair of fixed horizontally-spaced columns defining a path for the advance of a vehicle to be washed, a member rotatively supported and vertically shiftable on each column, a pair of brush-mounting yokes, a motor-driven brush journaled on each yoke, pairs of crossed arms pivotally connected together intermediate their ends, one arm of each pair being hinged at one end to one rotatable member and having the other arm end slidably connected to the respective yoke, the other arm of each pair being hinged at one end to the respective yoke and having the other end slidingly connected to the one rotatable member whereby the pairs of crossed arms support the respective yokes for horizontal reciprocation of the brushes in a common vertical plane and opposite swinging out of and into the common plane, hydraulic motor-means interposed between each column and the respective rotatable member for adjusting the vertical position of the respective rotatable members, other hydraulic motor-means interposed between each rotatable member and the respective crossed arms and between each standard and the respective rotatable member for oppositely reciprocating and oppositely swinging the yoke-mounted brushes, and a series of electrically-actuated mechanisms connected to effect the seriatim operation of the hydraulic motor-means to cause a sequential vertical adjustment and subsequent pressured movement of the brushes across one end, along the sides, and across the other end of the vehicle movable along the path between the posts.

References Cited in the file of this patent

UNITED STATES PATENTS

| | | |
|---|---|---|
| 1,411,321 | Wright | Apr. 4, 1922 |
| 1,654,664 | Parker | Jan. 3, 1928 |
| 1,666,170 | Fitzpatrick | Apr. 17, 1928 |
| 2,242,692 | Yingling | May 20, 1941 |
| 2,372,933 | Caldwell | Apr. 3, 1945 |
| 2,390,017 | Walsh | Nov. 27, 1945 |
| 2,865,034 | Petite | Dec. 23, 1958 |